Sept. 5, 1944.  W. W. PABST  2,357,600

CONVEYER

Filed Aug. 24, 1942  6 Sheets-Sheet 1

INVENTOR.
WALTER W. PABST
BY
Oscar A. Geier
ATTORNEY

Sept. 5, 1944.  W. W. PABST  2,357,600
CONVEYER
Filed Aug. 24, 1942  6 Sheets-Sheet 2

INVENTOR.
WALTER W. PABST
BY
Oscar A. Geier
ATTORNEY

Sept. 5, 1944.　　W. W. PABST　　2,357,600
CONVEYER
Filed Aug. 24, 1942　　6 Sheets-Sheet 4

INVENTOR.
WALTER W. PABST
BY
Oscar A. Geier
ATTORNEY

Patented Sept. 5, 1944

2,357,600

UNITED STATES PATENT OFFICE 2,357,600

CONVEYER

Walter W. Pabst, Elizabeth, N. J.

Application August 24, 1942, Serial No. 455,878

11 Claims. (Cl. 214—91)

This invention relates generally to loaders and more particularly to a combination elevator-conveyer, transfer and stacker.

Among the principal objects of the invention lies the provision of loader structure adapted to receive a plurality of articles in succession at one surface level and to elevate, convey, transfer and stack or pile said articles in the same order at another surface level, said last mentioned surface level being either above or below the first mentioned surface level.

The moving of large numbers of bulky articles from one location to another is a general problem confronting many industries. The present invention is concerned not so much with the vehicles themselves, such as trucks, box cars, barges and ships, but with structure for economically and efficiently loading such conveyances.

Another object of the present invention lies in the provision of a device of the class described which is portable so that the same can be operated, moved and maintained by a minimum amount of manual labor, although auxiliary equipment may be necessary to move the stacker unit.

Another object herein lies in the provision of loading equipment which is strong and relatively light in weight so that the same may be easily portable.

A still further object herein lies in the provision of a device having the hereindescribed characteristics, yet which is of simple construction so as to be low in first cost, maintenance and operation, permitting a consequent widespread sale and use.

These objects and other incidental advantages will more fully appear in the progress of this disclosure and be pointed out in the appended claims.

In the drawings constituting a material part hereof, similar reference characters designate corresponding parts throughout the several views, and in which.

The machine shown in Figures 1 to 7 comprises three physically separable units: an elevator-conveyer unit, a magazine-transfer and a stacker unit, generally indicated by numerals 10, 11 and 12 respectively. While the invention is capable of use with articles having various shapes, for the purpose of example the same is illustrated as adapted for use with barrels or drums having a generally cylindrical configuration. As so adapted a supply 13 of barrels may be disposed upon a working surface 14 such as a pier 15. Without raising the barrels from the working surface 14 they are manually fed to the unit 10 which elevates said barrels in consecutive order and deposits them upon the unit 11. On the unit 11 the barrels by the action of gravity are rolled down to the buffer 16 from which they are taken and lowered into the hold 17 of the ship 18 by the unit 12. A more detailed description of the operation of the various parts follows the description of the three units herebelow.

Turning now to the elevator-conveyer unit 10 best seen in Figures 1 to 7 inclusive, it will be seen that the unit 10 comprises generally a primary lower movable frame 20; a primary upper movable frame 21; a power source 22; means 23 to adjust the interrelation of the frames 20 and 21; a primary continuous flexible carrier 24; article carrying dogs 25; article lifting arms 26; article lifting arms actuating mechanism 27; and a delivery or discharge platform 28.

The primary lower movable frame 20 is substantially stationary when the unit 10 is in operation but is movable from place to place, by the operator, by reason of the fact that the frame 20 is mounted upon a pair of rear wheels 29 and a pair of front wheels 30. The frame 20 is preferably of oblong shape and may be fabricated in any desired manner, including longitudinal frame members 31, 32, and rear frame member 33, a front frame member 34 (see Figure 3) and an X shaped truss member 35. The rear wheels 29 are journalled in any suitable manner, below the rear frame member 33. Connecting the forward portions of the frame members 31 and 32 is a plate 36 below which is rotatably mounted a plate 37, which carries an axle 38 having journalled at the outer terminals thereof the wheels 30. The rotation of the plate 37 and the structure connected thereto about a vertical axis through the orificed boss 39 is facilitated by a plurality of rollers 40. A tongue 41, pivotally connected at the point 42 to the plate 37, serves as a pulling or pushing handle so that the lower frame 20 can be moved around carrying its superstructure with it.

The power source generally indicated by numeral 22 includes a prime mover 43, which while illustrated as being an electric motor, may have substituted therefor any other suitable medium such as a steam, gasoline, or Diesel engine. The motor 43 is provided with a gear reduction box 44 which is mounted upon a plate 45 extending between the frame elements 31 and 32.

The primary upper movable frame 21 is substantially stationary when the unit 10 is in operation, but it is movable with relation to the frame 20 for the purpose of adjusting the effective height of the delivery or discharge platform 28. The frame 21 is preferably of oblong shape and slightly longer than the frame 20 so as to compensate for the loss in effective length when the frame 21 is angularly disposed with relation to the horizontal. The frame 21 includes longitudinal frame members 46 and 47, a rear frame member 48, a front frame member 49, and an X shaped truss member 50. The front frame member 49 is preferably braced in position by means of a pair of corner gussets 51; while the rear frame member 48 is preferably in the form of a flat plate (see Figure 5) disposed at right angles to the frame members 46, 47, and depending therebelow. The frame member 48 is braced in position by a pair of braces 52.

The forward ends of the upper longitudinal frame members 46, 47 are orificed and lie laterally outside of the forward orificed ends of the lower longitudinal frame members 31, 32. These orifices are aligned and the multi-duty shaft 53 is journalled therein, and serves to pivotally mount the frame 21 on the frame 20. The means 23 to adjust the inter-relation of the frames 20 and 21 takes the form of a hydraulic jack having a cylinder 54, a piston 55, an operating handle 56, and a valve 57. The cylinder 54 is pivotally mounted on the intersection 58 of the truss 35 and the piston 55 is pivotally mounted under the intersection 59 of the truss 50 by means of the pillow blocks 60 and 61 respectively.

Figure 5:
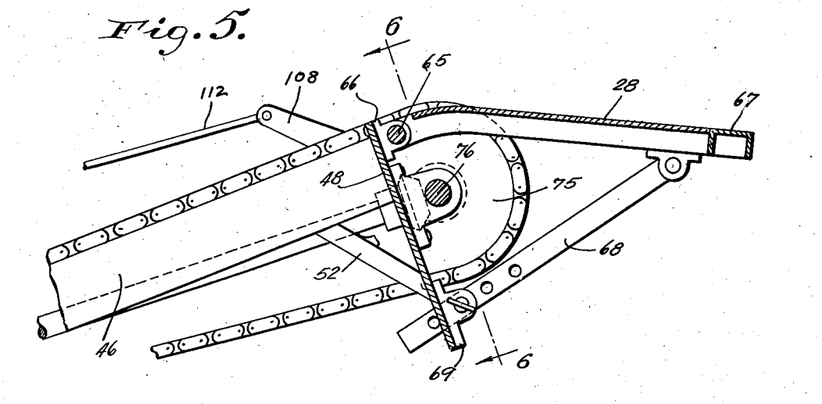
Figure 5 is a fragmentary enlarged vertical sectional view of the right hand portion of Figure 1, showing in detail the upper or delivery end at the rear of the elevator-conveyer unit including the discharge platform as seen from the plane 5 on Figure 2.
Figure 6:
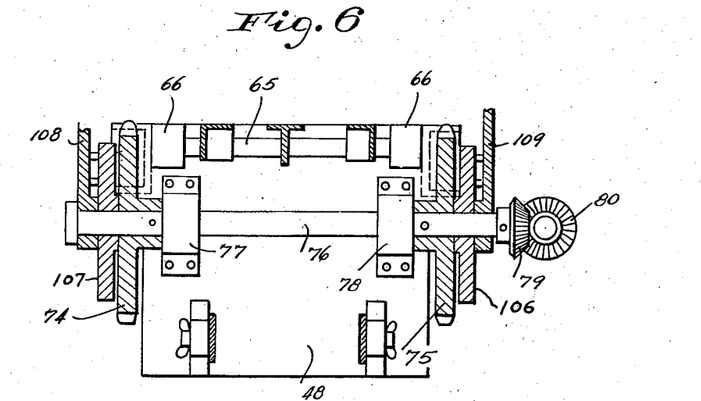
Figure 6 is a section along the plane 6—6 on Figure 5.
Figure 7:
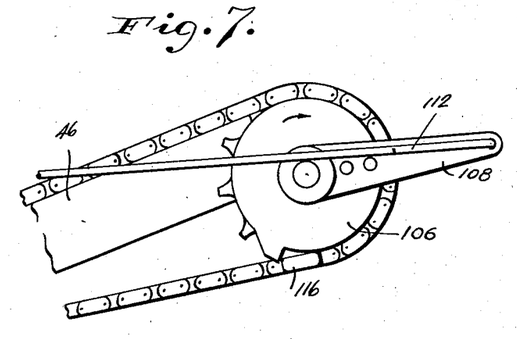
Figure 7 shows the lifting arm detent disc, and associated structure, in an actuated position thereof.

The delivery or discharge platform 28 includes a plurality of longitudinal frame members 62, 63, and 64, the forward ends of which are pivotally connected to the pin 65 (see Figures 5 and 6). Pin 65 is carried by supports 66 secured to the rear surface of the rear frame member 48. The rear ends of the frame members 62, 63 and 64 are interconnected by the channel 67 which is preferably an inverted U shape in cross section. The platform 28 is adjustably maintained in position by the shiftable brace 68 at the upper end thereof pivotally connected to the platform 28, and at the lower end thereof slidably penetrating the clamp 69 and the rear frame member 48 on which the clamp is attached.

Running above and below the frame members 46 and 47 are a pair of spaced and substantially parallel chains 70 and 71 referred to generally as the carrier 24. The chains 70 and 71 are preferably of the roller type since when carrying the articles 13 the chains ride along the upper surfaces of the upper longitudinal frame members 46 and 47 which act as tracks therefor. Chains 70 and 71 are carried at the lower bights thereof by idler sprockets 72 and 73 and are carried and driven at the upper bights thereof by the driver sprockets 74 and 75. The idler sprockets 72 and 73 are rotatably mounted on the multi-duty shaft 53. The driver sprockets 74 and 75 are fixedly mounted upon a shaft 76 journalled in bearing supports 77 and 78 mounted on the rear frame element 48. One end of the shaft 76 is provided with a bevel gear 79 which meshes with a bevel gear 80 on the upper end of a shaft 81. The shaft 81 is carried laterally outward, spaced and parallel to the upper longitudinal frame member 47 by the bearing supports 82 and 83. The lower end of shaft 81 has a bevel gear 84 fixedly mounted thereon which meshes with a bevel gear 85 fixed on one end of the shaft 53. Shaft 53 is positively driven by a pair of sprockets and a chain 86, one sprocket being fixed on the shaft 53 and the other on the gear reduction box 44. Electrical switches (not shown) may be placed on the unit 10 at convenient locations for controlling the movement of the carrier 24. Where the motor 43 is of some other type, appropriate controls may be similarly located.

Figure 1:
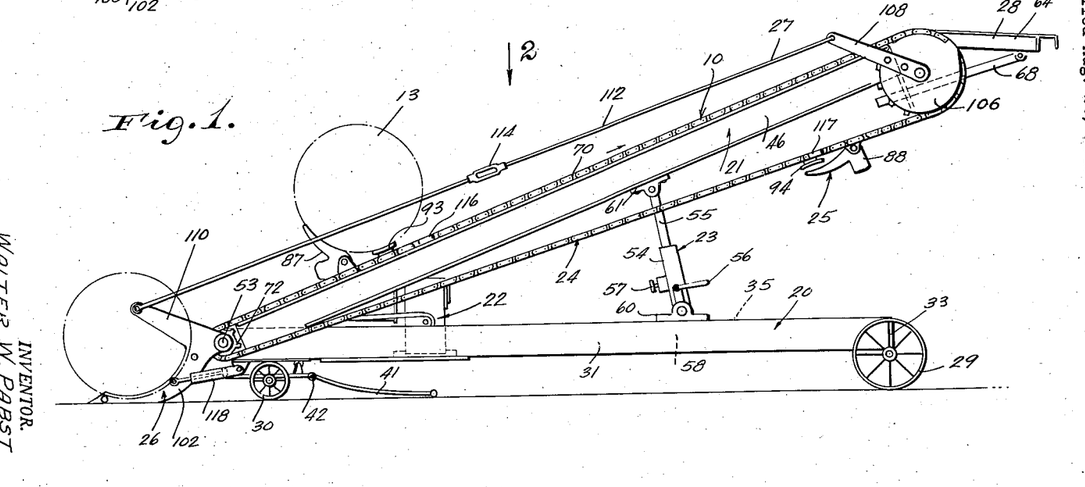
Figure 1 is a side elevational view of an embodiment of the invention showing the elevator-conveyer unit.
Figure 2:
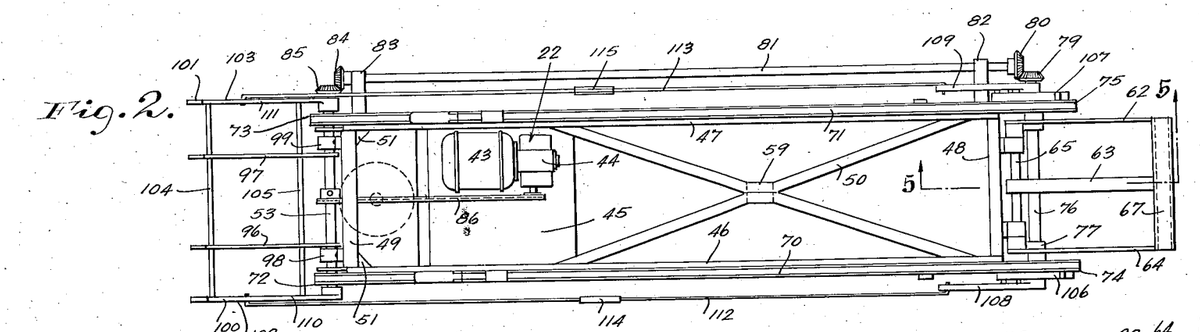
Figure 2 is a top plan view of Figure 1.
Figure 3:
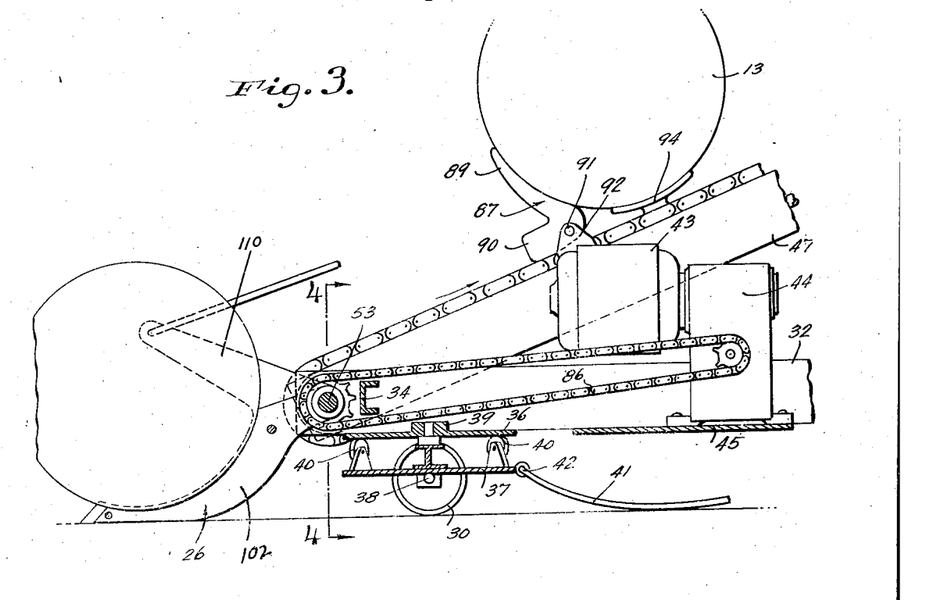
Figure 3 is an enlarged fragmentary vertical sectional view of the elevator conveyer unit showing in detail parts illustrated in elevation in the left end of Figure 1.
Figure 4:
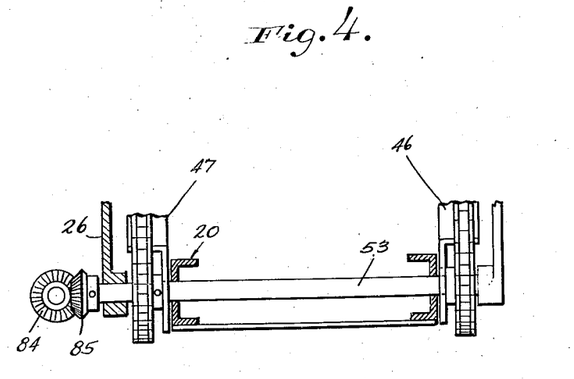
Figure 4 is a fragmentary vertical sectional view as seen from the plane 4—4 on Figure 3.

The carrier 24 is provided with two oppositely disposed pairs of article carrying dogs 87 and 88 generally referred to as the dogs 25. Since all of the dogs are of substantially identical construction, a description of one will suffice for all. As best seen in Figure 3, the dog 87 there shown includes the article engaging portion 89 and the counterweight 90. The article engaging portion is preferably curved so as to properly engage the article, and the counterweight is preferably angularly disposed with relation to the article engaging portion. The dog 87 is pivotally connected to the chain, say 47, by means of a pintle 91 in a pair of enlarged orificed links 92 and the dog is supported in its active position by the counterweight engaging the outer or upper surface of the chain. In order to properly seat the article 13 and to protect the carrier 24 from excessive localized wear, pairs of article seats 93, and 94 are provided. These are preferably in the form of enlarged links with a top plate carried above the general level of the upper or outer surface of the chain.

The dogs 25 when in the upper or active position thereof (dog 87, Figures 1 and 3) are upright and when pulled by the chain exert a lifting effect. When the dogs 25 pass the upper driver sprockets they become inverted to their lower or inactive position and are suspended from their pintles (dog 88, Figure 1). When the dogs are in the lower or inactive position thereof they extend a lesser distance perpendicularly from the plane of the carrier 24 than when they are in the active position. This permits locating the idler sprockets 72, 73 so that the peripheries thereof are closer to the working surface 14 than the length of the article engaging portion 89.

The article lifting arms generally indicated by numeral 26 include a pair of plain arms 96, 97 and a pair of bell-cranks 100 and 101. The arms 96, 97 are freely pivotally mounted on the multi-duty shaft 53 inwardly of the bearings 98, 99 which are mounted on the front frame member 49. The bell-cranks 100 and 101 are freely pivotally mounted on the shaft 53 outwardly of the idler sprockets 72 and 73 respectively. The plain arms 96 and 97 and the lower arms 102 and 103 of the bell-cranks are integrally connected by the tie rods 104, 105. The arms 96, 97, 102, and 103 have a certain configuration seen best in profile in Figures 1 and 3, including wedge shaped terminals and curved upper surfaces.

The article lifting arms actuating mechanism 27 is located principally at the upper rear end of the upper frame 21. A pair of followers 106 and 107 are freely rotably mounted on the shaft 76 and have secured thereto radial arms 108 and 109. The radial arms 108 and 109 are connected to the upper arms 110 and 111 of the bell cranks 100 and 101 by connecting rods 112 and 113 which are adjustable in length by means of the turnbuckles 114, 115. Each of the chains 70 and 71 has mounted on the outer lateral surfaces thereof two opposite pairs of projections 116 and 117. As the chains 70 and 71 travel their course these projections 116 and 117 alternately engage the followers 106, 107 and cause them to rotate through approximately one hundred eighty degrees, which motion is transmitted to article lifting arms 26. The projections are so positioned with relation to the pairs of dogs on the chains that the projection 117 causes the arms 26 to deposit an article 13 on the seats 93 while the projection 116 does the same for the seats 94. After the projection 117 or 116 as the case may be has passed forwardly from under the followers 106, 107 (see Figure 7), the weight of the article lifting arms 26 pulls the radial arms 108 and 109 to their normal forward position and in order to control this return, a suitable shock absorber, such as the hydraulic dashpot 118 is pivotally connected to the lower arm 102 and a suitable bracket on the forward under surface of the frame member 31.

Figures 8, 14:
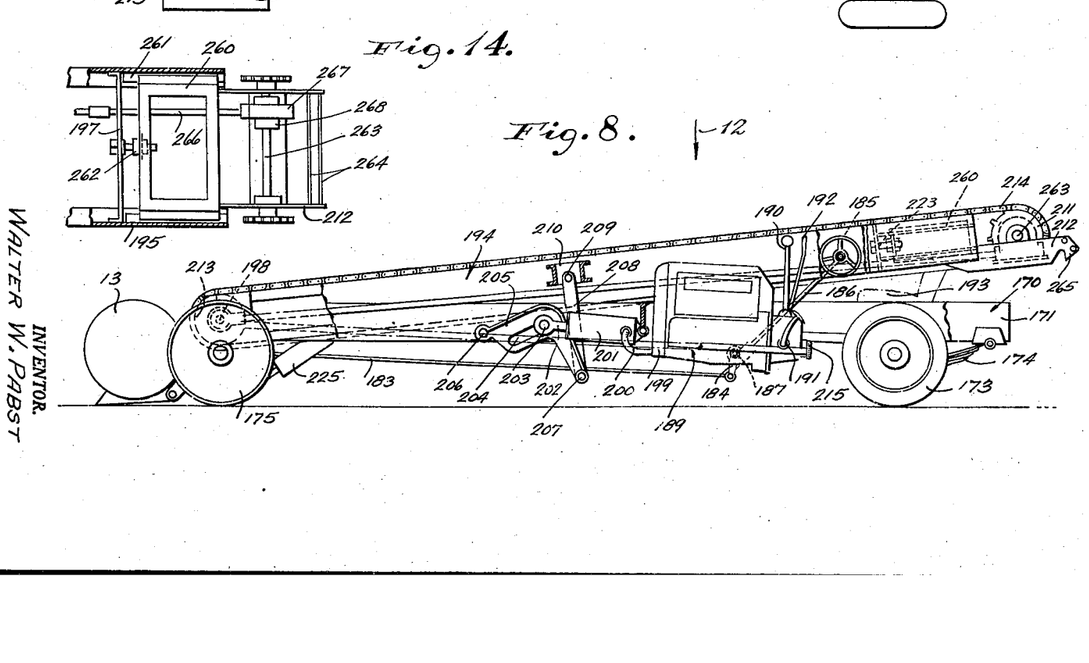
Figure 8 shows in side elevation a hydraulically operated elevator-conveyer unit.
Figure 14 is a top view of a part of the unit.
Figures 10, 11, 12:
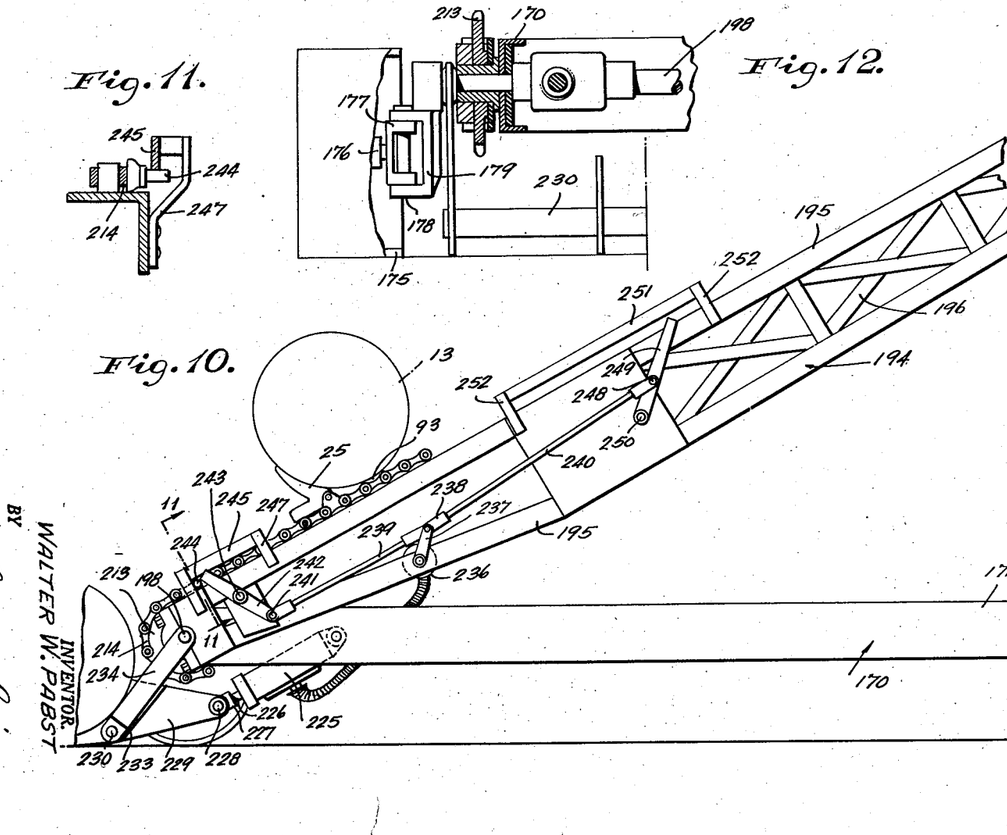
Figure 10 is a sectional view of the front portion of the unit.
Figure 11 is a section along the line 14—14 of Fig. 10.
Figure 12 is a section along the line 15—15 of Fig. 13.
Figure 13:
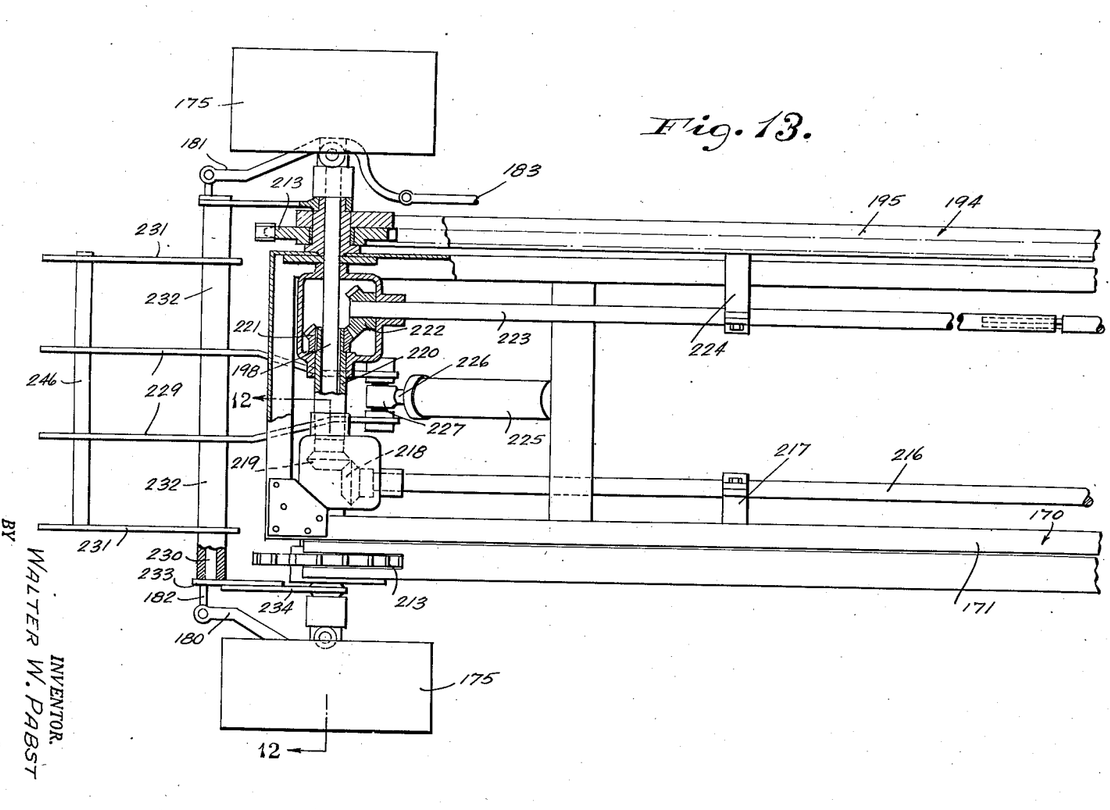
Figure 13 is a sectional plan view of the unit.

Figures 8 to 14 illustrate a hydraulically operated elevator-conveyer which is provided with a lower frame or chassis 170 comprising longitudinal frame members 171 and transverse or truss members 172. Rear wheels 173 are carried by springs 174 (Fig. 8) connected to the frame 170. Each of the front wheels 175 is carried by an axle 176 connected in the usual manner to a frame member 177 which is swingable about a vertical king pin 178 (Fig. 12). The pin 178 is carried by a frame element 179. The two wheels 175 carry levers 180 and 181, which are joined by a rod 182 (Fig. 13). The wheels 175 are steered by a drag link 183 which is connected to the lever 181. The rear end of the member 183 is connected to a swingable mounted lever 184 (Fig. 8). A hand wheel 185 which is operated by the driver, rotates a shaft 186 provided with a worm segment 187 which actuates the lever 184. Thus the front wheels 175 are steered by turning the hand wheel 185.

The machine is driven by a motor 189 which may be a usual automobile engine transmitting its power to the rear wheels 173 through the differential 188. The motor is provided with the usual transmission control 190, a clutch 191 and a brake 192. Thus the illustrated elevator-conveyor constitutes an independent self-propelling unit which may be conveniently moved from place to place by a driver seated at 193.

The movable upper frame or boom 194 includes longitudinal frame members 195 and X-shaped truss members 196 (Fig. 10) interconnected by transverse frame members 197. The forward end of the upper frame 194 is mounted upon a pivot or shaft 198 which is carried by the lower frame 170.

The upper frame 194 is raised or lowered in relation to the lower frame 170 by a hydraulically operated device which comprises a hydraulic pump 199 driven by the motor 189 (Fig. 8). The pump 199 is connected by a fluid-transmitting pipe 200 to a cylinder 201 the piston rod 202 of which carries a pin 203 movable in a slot 204 of an angular lever 205. The lever 205 is pivoted at 206 to the upper frame 194 and is connected by a pivot 207 with one end of a lever 208. The opposite end of the lever 208 is pivoted at 209 to a frame member 210 constituting a part of the upper frame 194.

Thus the piston rod 202 of the cylinder 201 which receives its fluid from the motor-driven pump 199, may swing the lever 205 about its pivot 206 and thereby move the lever 208 upwardly or downwardly so as to raise or lower the upper frame 194.

The upper frame 194 carries at its outer end a frame 260 which is slidable in guides 261 constituting a part of the frame 194. The frame 260 is connected with a frame member 197 by a jam nut 262. Brackets 212 are carried by the slidable frame 260 and support a shaft 263 for driver sprockets 211. The outer ends of the brackets 212 carry transverse rods 264 and are provided with hook-shaped extensions 265 for attaching the upper frame to a platform (Figs. 8 and 14).

A pair of idler sprockets 213 are mounted upon the shaft 198 in the front of the frame. Endless chains 214 extend between the sprockets 211 and 213.

Figure 9:
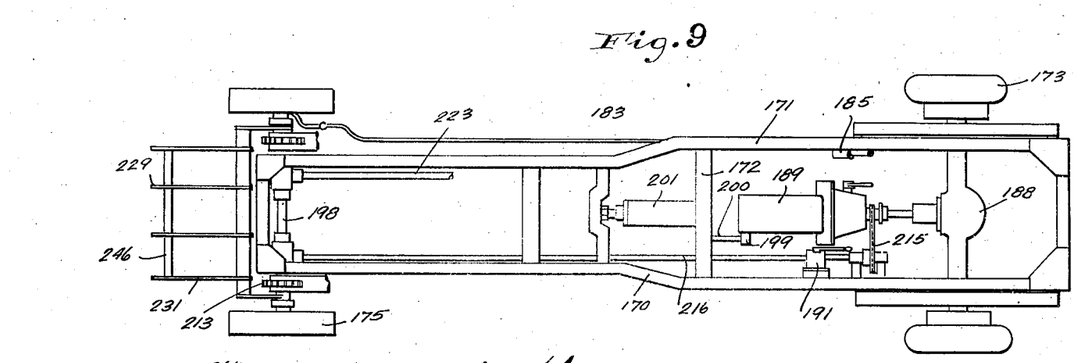
Figure 9 is a top plan view of Figure 8.

Sprockets 211 are driven by the motor 189 through the medium of a chain transmission 215 (Fig. 9) which connects the motor 189 with an elongated shaft 216. The shaft 216 is carried in brackets 217 (Fig. 13) attached to a frame member 171 constituting a part of the lower frame 170. The front end of the shaft 216 has the form of a bevel gear 218 meshing with a bevel gear 219 which is integral with a sleeve 220 carried by the shaft 198. The sleeve 220 is firmly connected with a bevel gear 221 meshing with a bevel gear 222 which constitutes the front end of a telescopic shaft 223. The shaft 223 is carried by brackets 224 attached to a longitudinal frame element 195 of the upper frame 194. The rear end of the shaft 223 telescopes with an extension shaft 266 (Fig. 14) which is operatively connected to the shaft 263 of the driver sprockets 211 by a worm 267 and a worm gear 268. Thus the chains 214 are driven from the motor 189 by the chain transmission 215, the shaft 216, carried by the lower frame 170, the bevel gears 218 and 219, the sleeve 220, the bevel gears 221 and 222, the shaft 223 which is carried by the upper frame 194, the extension shaft 266, the worm 267, the worm gear 268, the shaft 263 and the sprockets 211. It is apparent that the operative length of the chains 214 and the position of the sprockets 211 and of the hooks 265 may be conveniently adjusted by means of the slidable frame 260.

The chains 214 carry article-supporting dogs 25 and article seats 93 (Fig. 10) which are similar to those previously described.

The article lifting device is operated automatically and hydraulically from a cylinder 225 which is supplied with a fluid by the pump 199 through pipes not shown in the drawings. The piston rod 226 of the cylinder 225 is connected by a pivot 228 of a cross head 227 with the rear ends of two elongated lifter arms 229. A rod 230 carries the two elongated lifter arms 229 and two shorter lifter arms 231 (Fig. 13). Sleeves 232 upon the rod 230 serve as spacers maintaining the arms 229 and 231 in proper spaced relationship. A rod 246 interconnects the arms 229 and 231. The outer ends of the rod 230 are carried by supports 233 which are firmly connected with projecting members 234. The outer ends of members 234 are mounted upon the shaft 198.

The cylinder 225 is operatively connected with a four way valve 236 by any suitable means not shown in detail in the drawings. The valve 236 is carried by a frame member 195 and is opened or closed by a swingable lever 237. The lever 237 is pivotally connected to a sleeve 238. One end of the sleeve 238 is connected to a front rod 239, while the other end of the sleeve 238 is connected to a rear rod 240. The rod 239 is connected by a pivot 241 to an end of a lever 242 which is mounted intermediate its ends upon a pivot 243 carried by the frame 194. The free end of the lever 242 may be engaged by a projection 244 carried by a chain 214. As shown in Figures 10 and 11, a guide 245 is in engagement with the projection 244 while the latter presses against the lever 242 during an upward movement of that portion of the chain which carries the projection 244. The guide 245 is attached to the frame 194 by supports 247.

The rod 240 is connected by a pivot 248 with a lever 249 which is pivoted at 250. The free end of the lever 249 is situated in the path of the projection 244 which, while in engagement with the lever 249, is guided by a guide 251 attached by supports 252 to the frame 194.

Figure 10 illustrates the position of the various parts as the projection 244 is about to engage the upper end of the lever 242. In the course of the further upward movement of the projection 244, which moves along with the chain 214, the lever 242 is swung from the position shown in full lines in Figure 10 to operate valve 236. The rod 239 and the sleeve 238 move along with the lever 242, thereby swinging the lever 237 and opening the valve 236. At the same time, the lever 249 is moved by the rod 240 from its right hand position to its left hand position (looking in the direction of Fig. 10).

Since the valve 236 is connected with the cylinder 225 it will be actuated and will swing the lifter arms 229 and 231 about the rod 230. The arms 229 and 231 will raise the articles 13 and deposit them upon the dogs 25 and supports 93. Then the articles 13 will be transported upwardly by the chains 214, whereupon they may be deposited upon a suitable platform (not shown).

It is apparent that the specific illustrations shown above have been given by way of illustration and not by way of limitation and that they are capable of wide variation and modification without departing from the scope or intent of the present invention. All of such variations and modifications are to be included within the scope of the present invention.

I claim:

1. In a loading apparatus, a lower supporting frame, an upper conveyer carrying frame, a primary shaft journaled upon and pivotally connecting said frames at their front ends to permit the conveyer carrying frame to be raised and lowered with relation to the supporting frame, means for raising and lowering said conveyer carrying frame, a secondary shaft journaled upon the rear end of the conveyer carrying frame, power means on the supporting frame for driving the secondary shaft, an endless conveyer trained about said shafts and positively driven from the secondary shaft, a loading device at the front of the frames pivotally supported on the primary shaft for swinging movements toward and from the conveyer, and means actuated from and controlled by the conveyer for periodically swinging said loading device on its loading movement, said last named means including a set of crank arms on the loading device and a set of arms on the conveyer carrying frame, contact means on the conveyer for engaging and moving the second named set of arms, and a connecting medium between the said sets of arms.

2. In a loading apparatus, a lower supporting frame, an upper conveyer carrying frame, a primary drive shaft journaled upon and pivotally connecting said frames at their front ends to permit the conveyer carrying frame to be raised and lowered with relation to the supporting frame, means for raising and lowering said conveyer carrying frame, a secondary drive shaft journaled upon the rear end of the conveyer carrying frame, power means on the supporting frame for driving the primary drive shaft, inter-connecting gearing between the shafts for driving the secondary drive shaft from the primary drive shaft, an endless conveyer trained about said shafts and positively driven from the secondary drive shaft, a gravity retracted loading device at the front of the frames pivotally supported on the primary drive shaft for swinging movements toward and from the conveyer, and means actuated from and controlled by the conveyer on one portion of movement of the conveyer for swinging said loading device on its loading movement toward the conveyer and on another portion of movement of the conveyer releasing said loading device for retraction, said last named means including a set of crank arms on the loading device and a set of arms on the conveyer carrying frame, contact means on the conveyer for engaging and moving the second named set of arms, and a connecting medium between the said sets of arms.

3. In a loading apparatus, a lower supporting frame, an upper conveyer carrying frame, a primary drive shaft journaled upon and pivotally connecting said frames at their front ends to permit the conveyer carrying frame to be raised and lowered with relation to the supporting frame, means for raising and lowering said conveyer carrying frame, a secondary drive shaft journaled upon the rear end of the conveyer carrying frame, power means on the supporting frame for driving the primary drive shaft, inter-connecting gearing between the shafts for driving the secondary drive shaft from the primary drive shaft, idler sprockets revolubly mounted on the primary drive shaft, drive sprockets fixed to the secondary drive shaft, an endless chain conveyer trained about said sprockets and driven by the drive sprockets on the secondary drive shaft, a loading device at the front of the frames pivotally mounted on the primary drive shaft for swinging movements toward and from the conveyer, and means actuated from and controlled by the conveyer for periodically swinging said loading device on its loading movement, said last named means including a set of crank arms on the loading device and a set of arms on the conveyer carrying frame, contact means on the conveyer for engaging and moving the second named set of arms, and a connecting medium between the said sets of arms.

4. In a loading apparatus, a lower supporting frame, an upper conveyer carrying frame, a primary drive shaft journaled upon and pivotally connecting said frames at their front ends to permit the conveyer carrying frame to be raised and lowered with relation to the supporting frame, a secondary drive shaft journaled upon the rear end of the conveyer carrying frame, means for raising and lowering said conveyer carrying frame, power means on the supporting frame for driving the primary drive shaft, interconnecting gearing between the shafts for driving the secondary drive shaft from the primary drive shaft, an endless conveyer trained about said shafts and positively driven from the secondary drive shaft, a loading device at the front of the frames pivotally supported on the primary drive shaft for swinging movements toward and from the conveyer, and means actuated from and controlled by the conveyer for periodically swinging said loading device on its loading movement, said last named means including a set of arms on the loading device and a set of arms on the conveyer carrying frame, contact means on the conveyer for engaging and moving the second named set of arms, and a connecting medium between the said sets of arms.

5. In a loading apparatus, a lower supporting frame, an upper conveyer carrying frame, a shaft journaled upon and pivotally connecting said frames at their front ends, a shaft journaled upon the rear end of the conveyer carrying frame, power means on the supporting frame for driving the second named shaft, an endless conveyer trained about said shafts and positively driven from the second named shaft, a loading device at the front of the frames pivotally mounted on the first-named shaft for swinging movements toward and from the conveyer, and means actuated from and controlled by the conveyer for swinging said loading device on its loading movement, said means including a rocker arm mounted on said second named shaft, an operating means between the rocker arm and the loading device for swinging the latter, and a contact device on the conveyer for actuating the rocker arm.

6. In a loading apparatus, a lower supporting frame, an upper conveyer carrying frame, a primary drive shaft journaled upon and pivotally connecting said frames at their front ends, a secondary drive shaft journaled upon the rear end of the conveyer carrying frame, motive power means on the supporting frame for driving the primary drive shaft, interconnecting gearing between the shafts for driving the secondary drive shaft from the primary drive shaft, an endless conveyer trained about said shafts and driven from the secondary drive shaft, a loading device at the front of the frames pivotally mounted on the primary drive shaft for swinging movements toward and from the conveyer, and means actuated from and controlled by the conveyer for swinging said loading device on its loading movement, said means including a set of crank arms on the loading device, a set of crank arms mounted on the conveyer carrying frame, contact means on the conveyer for engaging and moving the second named set of crank arms, and connecting rods between the sets of crank arms.

7. In a loading apparatus, a lower supporting frame, an upper conveyer carrying frame, a front shaft journaled upon and pivotally connecting said frames at their front ends to permit the conveyer carrying frame to be raised or lowered with relation to the supporting frame, a rear shaft journaled upon the rear end of the conveyer carrying frame, means for raising and lowering the conveyer carrying frame with relation to the supporting frame, means on the supporting frame for driving the rear shaft, an endless chain conveyer trained about said shafts and driven from the rear shaft, and pivotally mounted article engaging dogs on the conveyer, each dog having an article engaging arm and a weighted arm, the latter being adapted to rest on the conveyer and support the article engaging arm in working position when the dog is on the working stretch of the conveyer and being adapted to swing said arm to a position parallel with the return stretch of the conveyer when in the travel of the conveyer the dog is on said return stretch, a loading device pivotally supported at the front end of the frames for swinging movement toward and from the conveyer, and means actuated from and controlled by the conveyer for periodically swinging said loading device on its loading movement to deliver articles from the said loading device to the conveyer in immediate advance of the said dog, said last named means including a set of crank arms on the loading device and a set of crank arms on the conveyer carrying frame, contact means on the conveyer for engaging and moving the second named set of crank arms, and a connecting rod between the said sets of arms.

8. In a loading apparatus, a lower supporting frame, an upper conveyer carrying frame, a front shaft journaled in and pivotally connecting said frames at their front ends to permit the conveyer carrying frame to be raised and lowered with relation to the supporting frame, a rear shaft journaled upon the rear end of the conveyer carrying frame, power means on the supporting frame for driving the rear shaft, an endless conveyer trained about said shafts and positively driven from the rear shaft, a loading device at the front of the frames pivotally mounted on the front shaft for swinging movements toward and from the conveyer, means controlled by the conveyer for swinging said loading device on its loading movement, said last named means including a set of crank arms on the loading device and a set of arms on the conveyer carrying frame, contact means on the conveyer for engaging and moving the second named set of arms, and a connecting medium between the said sets of arms, supporting wheels at the rear of the supporting frame, and a wheeled truck at the front of the frame having a draft tongue and having a turntable connection with the frame whereby the truck may be disposed to bring the tongue to an inward position beneath the frame or to an outward position beneath and beyond the loading device.

9. In a device of the character specified, the combination of a conveyer carrying frame having a receiving end and a discharge end, shafts at the respective ends of the said frame, an endless conveyer trained about the said shafts, drive means for driving the said conveyer, a loading device pivotally mounted at the receiving end of the said frame for swinging movement toward and from the said conveyer, means actuated from and controlled by the said conveyer for swinging said loading device on its loading movement, said last named means including a set of crank arms on the loading device and a set of arms pivotally mounted at the discharge end of the conveyer, contact means on the conveyer for periodically engaging and moving the second named set of arms and connecting rods between the said sets of arms.

10. In a device of the character specified, the combination of a conveyer carrying frame having a receiving end and a discharge end, shafts at the respective ends of the said frame, an endless conveyer trained about the said shafts, drive means for driving the said conveyer, an article engaging dog on the said conveyer, a loading device pivotally mounted a the receiving end of the said frame for swinging movement toward and from the said conveyer and positioned to deliver articles to the said conveyer immediately in advance of the said dog, and means actuated from and controlled by the said conveyer for swinging said loading device on its loading movement, said last named means including a set of crank arms on the loading device and a set of arms pivotally mounted at the discharge end of the conveyer, contact means on the conveyer for periodically engaging and moving the said second named set of arms, and connecting rods between the said sets of arms.

11. In a device of the character specified, the combination of a conveyer carrying frame having a receiving end and a discharge end, shafts at the respective ends of the said frame, an endless conveyer trained about the said shafts, drive means for driving the said conveyer, an article engaging dog on the said conveyer, an article seat on the conveyer in advance of the said dog, a loading device pivotally mounted at the receiving end of the said frame for swinging movement toward and from said conveyer and positioned to deliver articles to the said article seat in advance of the said dog and in contact therewith, and means actuated from and controlled by the said conveyer for swinging said loading device on its loading movement, said last named means including a set of crank arms on the loading device and a set of arms pivotally mounted at the discharge end of the conveyer, contact means on the conveyer for periodically engaging and moving the said second named set of arms, and connecting rods between the said sets of arms.

WALTER W. PABST.